(12) United States Patent
Fisher

(10) Patent No.: US 11,367,061 B2
(45) Date of Patent: *Jun. 21, 2022

(54) REMOTE DELIVERY OF DIGITAL ARTIFACTS WITHOUT A PAYMENT TRANSACTION

(71) Applicant: Michelle Fisher, Oakland, CA (US)

(72) Inventor: Michelle Fisher, Oakland, CA (US)

(73) Assignee: Michelle Fisher, Bekeley (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/143,085

(22) Filed: Dec. 30, 2013

(65) Prior Publication Data

US 2014/0297518 A1    Oct. 2, 2014

Related U.S. Application Data

(63) Continuation of application No. 13/735,337, filed on Jan. 7, 2013, now Pat. No. 8,620,754, and a (Continued)

(51) Int. Cl.
*G06Q 20/32* (2012.01)
*G06Q 20/20* (2012.01)
(Continued)

(52) U.S. Cl.
CPC .......... *G06Q 20/20* (2013.01); *G06Q 20/00* (2013.01); *G06Q 20/108* (2013.01); *G06Q 20/16* (2013.01);
(Continued)

(58) Field of Classification Search
CPC ........... G06Q 20/00–40; G06Q 20/102; G06Q 20/105; G06Q 30/0207; G06Q 30/02; G06Q 30/00–06; G06Q 20/04; G06Q 20/3274; G06Q 20/045; G06Q 20/3674; G06Q 20/12; G06Q 30/0251; H04L 67/2814; H04L 15/04; H04L 29/12594; H04L 12/56;
(Continued)

(56) References Cited

U.S. PATENT DOCUMENTS 5,852,775 A * 12/1998 Hidary ................ H04L 12/1859
455/412.1
5,887,266 A * 3/1999 Heinonen .............. G06Q 20/04
455/406
(Continued)

FOREIGN PATENT DOCUMENTS

WO    WO 2006095212 A1 *  9/2006  ............ H04M 11/00
WO    WO 2006095212 A1     9/2006
WO    WO2006/114601        11/2006

OTHER PUBLICATIONS

U.S. Appl. No. 11/467,441, Office Action dated May 27, 2009, 17 p.
(Continued)

*Primary Examiner* — Olusegun Goyea

(57) ABSTRACT

A method and system for receiving digital artifacts from a management server. The method includes sending a request for a digital artifact from a mobile application to the management server for display within a specific mobile application generated screen, receiving the digital artifact from the management server, and displaying the digital artifact with the specific mobile application generated screen.

55 Claims, 4 Drawing Sheets

Related U.S. Application Data continuation of application No. 11/948,903, filed on Nov. 30, 2007, now Pat. No. 8,352,323.

(51) Int. Cl.
| | |
|---|---|
| *H04W 4/21* | (2018.01) |
| *G06Q 30/02* | (2012.01) |
| *G06Q 30/06* | (2012.01) |
| *H04M 1/72445* | (2021.01) |
| *G06Q 20/38* | (2012.01) |
| *G06Q 20/40* | (2012.01) |
| *G06Q 20/36* | (2012.01) |
| *G06Q 20/16* | (2012.01) |
| *G06Q 20/00* | (2012.01) |
| *G06Q 20/10* | (2012.01) |
| *H04W 8/20* | (2009.01) |
| *H04W 4/18* | (2009.01) |
| *H04B 5/00* | (2006.01) |
| *G06Q 40/00* | (2012.01) |
| *H04W 4/80* | (2018.01) |
| *H04W 4/029* | (2018.01) |
| *H04N 21/81* | (2011.01) |
| *G07F 7/10* | (2006.01) |
| *H04W 88/02* | (2009.01) |
| *H04W 4/02* | (2018.01) |

(52) U.S. Cl.
CPC ......... *G06Q 20/202* (2013.01); *G06Q 20/204* (2013.01); *G06Q 20/322* (2013.01); *G06Q 20/325* (2013.01); *G06Q 20/326* (2020.05); *G06Q 20/3223* (2013.01); *G06Q 20/3226* (2013.01); *G06Q 20/3227* (2013.01); *G06Q 20/3255* (2013.01); *G06Q 20/3278* (2013.01); *G06Q 20/3674* (2013.01); *G06Q 20/382* (2013.01); *G06Q 20/3821* (2013.01); *G06Q 20/40* (2013.01); *G06Q 20/409* (2013.01); *G06Q 20/4012* (2013.01); *G06Q 20/4014* (2013.01); *G06Q 30/02* (2013.01); *G06Q 30/0222* (2013.01); *G06Q 30/0238* (2013.01); *G06Q 30/0251* (2013.01); *G06Q 30/0253* (2013.01); *G06Q 30/0255* (2013.01); *G06Q 30/0267* (2013.01); *G06Q 30/0268* (2013.01); *G06Q 30/06* (2013.01); *G06Q 30/0613* (2013.01); *G06Q 30/0635* (2013.01); *G06Q 40/10* (2013.01); *G06Q 40/12* (2013.12); *H04B 5/0025* (2013.01); *H04M 1/72445* (2021.01); *H04W 4/18* (2013.01); *H04W 4/21* (2018.02); *H04W 8/205* (2013.01); *G06Q 20/10* (2013.01); *G06Q 20/105* (2013.01); *G06Q 40/00* (2013.01); *G07F 7/1008* (2013.01); *H04N 21/812* (2013.01); *H04W 4/02* (2013.01); *H04W 4/029* (2018.02); *H04W 4/80* (2018.02); *H04W 88/02* (2013.01)

(58) Field of Classification Search
CPC ....... H04L 12/18; H04L 29/06; H04L 67/306; G06K 7/10; G06K 7/10554; G06F 9/00; G06F 3/0482; H04Q 7/24; H04Q 7/20
USPC ...... 705/7, 16, 18, 30–34, 40–44, 70, 14.66, 705/26, 56, 64, 14.64, 14.58, 26.8, 27, 705/1.1; 455/406, 407, 414.1; 715/700, 715/810; 235/375–385, 451, 462.01, 235/462.46; 709/204–206; 725/23, 34; 370/338, 312, 390, 468, 444
See application file for complete search history.

(56) References Cited

U.S. PATENT DOCUMENTS

| | | | | |
|---|---|---|---|---|
| 5,915,243 | A * | 6/1999 | Smolen | G06Q 30/02 379/92.01 |
| 5,930,764 | A * | 7/1999 | Melchione | G06Q 30/02 705/7.29 |
| 6,018,654 | A * | 1/2000 | Valentine | H04W 8/245 455/414.4 |
| 6,036,086 | A * | 3/2000 | Sizer, II | G06Q 20/32 235/375 |
| 6,038,367 | A | 3/2000 | Abecassis | |
| 6,075,971 | A * | 6/2000 | Williams | H04N 7/165 725/23 |
| 6,101,483 | A * | 8/2000 | Petrovich | G06Q 20/343 705/26.8 |
| 6,115,601 | A * | 9/2000 | Ferreira | H04M 17/20 455/406 |
| 6,123,259 | A * | 9/2000 | Ogasawara | G06Q 30/0267 705/14.1 |
| 6,128,655 | A | 10/2000 | Fields | |
| 6,141,666 | A | 10/2000 | Tobin | |
| 6,199,082 | B1 | 3/2001 | Ferrel | |
| 6,243,447 | B1 * | 6/2001 | Swartz | G06K 7/0008 379/110.01 |
| 6,250,557 | B1 * | 6/2001 | Forslund | G06Q 20/363 235/375 |
| 6,305,603 | B1 * | 10/2001 | Grunbok, Jr. | G06Q 20/02 235/379 |
| 6,334,109 | B1 * | 12/2001 | Kanevsky | G06Q 30/02 705/14.67 |
| 6,394,341 | B1 * | 5/2002 | Makipaa | G06Q 20/04 235/379 |
| 6,415,156 | B1 | 7/2002 | Stadelmann | |
| 6,450,407 | B1 * | 9/2002 | Freeman | G06K 19/0723 235/487 |
| 6,487,540 | B1 * | 11/2002 | Smith | G06Q 20/02 705/21 |
| 6,535,132 | B2 * | 3/2003 | Waters | G09F 3/00 235/383 |
| 6,587,835 | B1 * | 7/2003 | Treyz | H04M 15/8033 705/14.64 |
| 6,605,120 | B1 | 8/2003 | Fields | |
| 6,647,257 | B2 * | 11/2003 | Owensby | H04M 3/42348 455/414.1 |
| 6,771,981 | B1 | 8/2004 | Zalewski | |
| 6,772,396 | B1 | 8/2004 | Cronin | |
| 6,775,539 | B2 * | 8/2004 | Deshpande | G06Q 30/02 455/414.4 |
| 6,886,017 | B1 | 4/2005 | Jackson | |
| 6,950,939 | B2 | 9/2005 | Tobin | |
| 6,975,856 | B2 * | 12/2005 | Ogasawara | G06Q 20/108 455/411 |
| 7,031,945 | B1 | 4/2006 | Donner | |
| 7,069,248 | B2 | 6/2006 | Huber | |
| 7,092,905 | B2 * | 8/2006 | Behrenbrinker | G06Q 20/04 705/35 |
| 7,096,003 | B2 | 8/2006 | Joao | |
| 7,110,744 | B2 | 9/2006 | Freeny | |
| 7,110,792 | B2 * | 9/2006 | Rosenberg | G07F 7/0886 455/406 |
| 7,127,236 | B2 | 10/2006 | Khan | |
| 7,200,578 | B2 * | 4/2007 | Paltenghe | G06Q 20/3574 705/26.1 |
| 7,289,810 | B2 | 10/2007 | Jagadeesan | |
| 7,308,254 | B1 | 12/2007 | Rissanen | |
| 7,357,312 | B2 | 4/2008 | Gangi | |
| 7,379,920 | B2 | 5/2008 | Leung | |
| 7,383,226 | B2 * | 6/2008 | Kight | G06Q 20/108 705/40 |
| 7,472,829 | B2 | 1/2009 | Brown | |
| 7,482,925 | B2 | 1/2009 | Hammad | |
| 7,487,912 | B2 * | 2/2009 | Seifert | G06Q 20/0453 235/380 |
| 7,512,567 | B2 * | 3/2009 | Bemmel | G06Q 40/12 705/64 |

(56) References Cited

U.S. PATENT DOCUMENTS

| | | | |
|---|---|---|---|
| 7,522,905 B2 | 4/2009 | Hammad | |
| 7,555,284 B2* | 6/2009 | Yan | G06Q 20/045 455/411 |
| 7,589,628 B1* | 9/2009 | Brady, Jr. | G01C 21/32 340/8.1 |
| 7,725,369 B2* | 5/2010 | Shiftan | G06Q 10/087 705/24 |
| 7,739,596 B2 | 6/2010 | Clarke-Martin | |
| 7,783,532 B2* | 8/2010 | Hsu | G06Q 30/0234 705/28 |
| 7,784,684 B2* | 8/2010 | Labrou | G07F 7/1008 705/64 |
| 7,818,284 B1* | 10/2010 | Walker | G06Q 30/0605 705/26.2 |
| 7,827,056 B2* | 11/2010 | Walker | G06Q 20/387 705/14.1 |
| 7,870,077 B2* | 1/2011 | Woo | G06Q 20/385 705/16 |
| 7,979,519 B2* | 7/2011 | Shigeta | H04L 69/329 709/224 |
| 8,005,426 B2* | 8/2011 | Huomo | H04W 12/082 235/441 |
| 8,019,362 B2* | 9/2011 | Sweatman | H04W 88/184 455/466 |
| 8,073,424 B2* | 12/2011 | Sun | G06Q 20/085 455/406 |
| 8,086,534 B2* | 12/2011 | Powell | G06Q 20/32 705/64 |
| 8,109,444 B2* | 2/2012 | Jain | G06K 7/10237 235/487 |
| 8,121,945 B2 | 2/2012 | Rackley | |
| 8,127,984 B2* | 3/2012 | Zatloukal | G06K 19/0723 455/73 |
| 8,214,454 B1* | 7/2012 | Barnes | G06F 16/955 709/217 |
| 8,396,758 B2* | 3/2013 | Paradise | G06Q 30/0609 705/26.1 |
| 8,429,030 B2* | 4/2013 | Walker | G06Q 30/06 705/26.7 |
| 8,429,031 B2* | 4/2013 | Walker | G06Q 30/0224 705/26.7 |
| 8,429,048 B2* | 4/2013 | Singh | G06Q 20/20 705/35 |
| 8,438,077 B2* | 5/2013 | Walker | G06Q 30/0601 705/26.7 |
| 8,438,078 B2* | 5/2013 | Walker | G06Q 10/087 705/26.7 |
| 8,467,766 B2* | 6/2013 | Rackley, III | G06Q 20/3223 455/406 |
| 8,489,067 B2* | 7/2013 | Rackley, III | G06Q 20/102 455/406 |
| 8,510,220 B2* | 8/2013 | Rackley, III | G06Q 20/102 705/40 |
| 8,693,995 B2 | 4/2014 | Fisher | |
| 9,183,571 B2* | 11/2015 | Kansal | H04L 67/10 |
| 9,852,449 B2* | 12/2017 | Kansal | H04L 67/10 |
| 9,996,849 B2 | 6/2018 | Fisher | |
| 10,339,556 B2 | 7/2019 | Fisher | |
| 10,621,612 B2 | 4/2020 | Fisher | |
| 10,825,007 B2 | 11/2020 | Fisher | |
| 2001/0011250 A1* | 8/2001 | Paltenghe | G07F 7/08 705/41 |
| 2001/0018660 A1* | 8/2001 | Sehr | G06Q 10/02 705/5 |
| 2001/0044751 A1* | 11/2001 | Pugliese, III | G06Q 30/02 705/14.1 |
| 2001/0044900 A1* | 11/2001 | Uchida | G06F 21/32 713/186 |
| 2001/0049636 A1* | 12/2001 | Hudda | G06Q 30/0601 705/26.1 |
| 2002/0004855 A1* | 1/2002 | Cox | H04L 29/06 719/328 |
| 2002/0019228 A1* | 2/2002 | McKenna | H04W 8/26 455/433 |
| 2002/0026423 A1* | 2/2002 | Maritzen | G06Q 20/023 705/56 |
| 2002/0056091 A1* | 5/2002 | Bala | G06Q 30/02 725/23 |
| 2002/0059100 A1 | 5/2002 | Shore | |
| 2002/0059147 A1* | 5/2002 | Ogasawara | G06Q 20/108 705/70 |
| 2002/0060246 A1* | 5/2002 | Gobburu | G06Q 20/32 235/462.46 |
| 2002/0063895 A1 | 5/2002 | Agata | |
| 2002/0065774 A1* | 5/2002 | Young | G06Q 20/326 705/41 |
| 2002/0072931 A1* | 6/2002 | Card | G06Q 20/363 705/1.1 |
| 2002/0077918 A1 | 6/2002 | Lerner | |
| 2002/0082879 A1 | 6/2002 | Miller | |
| 2002/0091568 A1* | 7/2002 | Kraft | G06Q 30/0261 705/14.58 |
| 2002/0099798 A1* | 7/2002 | Fedorovsky | G06F 16/9535 709/219 |
| 2002/0101993 A1* | 8/2002 | Eskin | H04W 4/02 380/270 |
| 2002/0107756 A1 | 8/2002 | Hammons | |
| 2002/0116269 A1* | 8/2002 | Ishida | G06Q 30/0267 719/318 |
| 2002/0160761 A1* | 10/2002 | Wolfe | H04M 3/493 455/566 |
| 2002/0161666 A1* | 10/2002 | Fraki | G06Q 30/0633 705/26.8 |
| 2002/0164998 A1* | 11/2002 | Younis | G01S 19/06 455/456.1 |
| 2002/0169664 A1* | 11/2002 | Walker | G06Q 30/0207 705/26.1 |
| 2002/0169984 A1 | 11/2002 | Kumar | |
| 2002/0175955 A1* | 11/2002 | Gourdol | G06F 3/0482 715/821 |
| 2002/0184096 A1 | 12/2002 | Kawahara | |
| 2003/0028426 A1* | 2/2003 | Banerjee | G06Q 30/02 705/14.37 |
| 2003/0033272 A1* | 2/2003 | Himmel | G07G 5/00 |
| 2003/0050058 A1* | 3/2003 | Walsh | H04N 7/163 348/E7.071 |
| 2003/0061113 A1* | 3/2003 | Petrovich | G06Q 10/087 705/26.43 |
| 2003/0065805 A1 | 4/2003 | Barnes | |
| 2003/0066883 A1* | 4/2003 | Yu | G06Q 20/04 235/382 |
| 2003/0074259 A1* | 4/2003 | Slyman, Jr. | G06Q 30/0221 705/17 |
| 2003/0085286 A1* | 5/2003 | Kelley | G07F 7/1008 235/492 |
| 2003/0087601 A1* | 5/2003 | Agam | H04W 12/06 455/39 |
| 2003/0093311 A1* | 5/2003 | Knowlson | H04M 15/58 705/14.66 |
| 2003/0093695 A1 | 5/2003 | Dutta | |
| 2003/0105641 A1 | 6/2003 | Lewis | |
| 2003/0132298 A1* | 7/2003 | Swartz | G07G 1/0072 235/472.02 |
| 2003/0140004 A1 | 7/2003 | O'Leary | |
| 2003/0142039 A1* | 7/2003 | Minear | H04W 4/24 345/2.3 |
| 2003/0163359 A1* | 8/2003 | Kanesaka | G06Q 30/0204 705/7.33 |
| 2003/0172028 A1 | 9/2003 | Abell | |
| 2003/0208754 A1* | 11/2003 | Sridhar | H04N 21/25883 348/E7.071 |
| 2003/0220839 A1* | 11/2003 | Nguyen | G06Q 30/0238 705/26.1 |
| 2004/0006497 A1 | 1/2004 | Nestor | |
| 2004/0015547 A1* | 1/2004 | Griffin | H04L 51/04 709/204 |
| 2004/0015548 A1* | 1/2004 | Lee | H04L 51/04 709/204 |

(56) References Cited

U.S. PATENT DOCUMENTS

| | | |
|---|---|---|
| 2004/0030601 A1 | 2/2004 | Pond |
| 2004/0030658 A1* | 2/2004 | Cruz ........................ G07F 17/42 |
| | | 705/65 |
| 2004/0034544 A1 | 2/2004 | Fields |
| 2004/0039709 A1* | 2/2004 | Pirhonen ................ G06Q 20/16 |
| | | 705/72 |
| 2004/0064407 A1* | 4/2004 | Kight ...................... G06Q 40/06 |
| | | 705/40 |
| 2004/0064408 A1* | 4/2004 | Kight ...................... G06Q 40/00 |
| | | 705/40 |
| 2004/0064409 A1* | 4/2004 | Kight ...................... G06Q 20/10 |
| | | 705/40 |
| 2004/0064410 A1* | 4/2004 | Kight ...................... G06Q 40/04 |
| | | 705/40 |
| 2004/0073497 A1* | 4/2004 | Hayes ................ G06Q 30/0601 |
| | | 705/26.1 |
| 2004/0078266 A1 | 4/2004 | Kim |
| 2004/0078329 A1* | 4/2004 | Kight ...................... G06Q 20/04 |
| | | 705/40 |
| 2004/0083167 A1* | 4/2004 | Kight .................... G06Q 40/025 |
| | | 705/40 |
| 2004/0093271 A1* | 5/2004 | Walker .................... G06Q 30/02 |
| | | 705/26.1 |
| 2004/0093620 A1* | 5/2004 | Iino ........................ H04H 20/28 |
| | | 725/32 |
| 2004/0111320 A1* | 6/2004 | Schlieffers ............... A47F 9/047 |
| | | 705/16 |
| 2004/0122768 A1* | 6/2004 | Creamer ............... G06Q 20/105 |
| | | 705/41 |
| 2004/0127256 A1* | 7/2004 | Goldthwaite .......... G06Q 20/32 |
| | | 455/466 |
| 2004/0143545 A1* | 7/2004 | Kulakowski ........... G06Q 20/04 |
| | | 705/39 |
| 2004/0148226 A1* | 7/2004 | Shanahan .......... G06Q 30/0241 |
| | | 705/14.73 |
| 2004/0172295 A1* | 9/2004 | Dahlin .................... G16H 10/60 |
| | | 705/2 |
| 2004/0188520 A1* | 9/2004 | Kohta ..................... G06K 19/10 |
| | | 235/382 |
| 2004/0203616 A1* | 10/2004 | Minear .................... H04L 67/36 |
| | | 455/566 |
| 2004/0203848 A1* | 10/2004 | Kumar .................... H04W 4/02 |
| | | 455/433 |
| 2004/0223513 A1* | 11/2004 | Meago .................... H04L 47/14 |
| | | 370/444 |
| 2004/0226045 A1* | 11/2004 | Nadarajah .......... H04N 21/6175 |
| | | 725/63 |
| 2004/0235450 A1* | 11/2004 | Rosenberg ............. G16H 10/60 |
| | | 455/406 |
| 2004/0235493 A1* | 11/2004 | Ekerborn ................ H04W 4/02 |
| | | 455/466 |
| 2004/0243519 A1 | 12/2004 | Perttila |
| 2004/0254836 A1* | 12/2004 | Emoke Barabas ........................ |
| | | G06Q 30/0267 |
| | | 705/14.35 |
| 2004/0267618 A1 | 12/2004 | Judicibus |
| 2004/0267665 A1 | 12/2004 | Nam |
| 2005/0003810 A1 | 1/2005 | Chu |
| 2005/0037735 A1* | 2/2005 | Coutts .................... G06Q 40/02 |
| | | 455/418 |
| 2005/0040230 A1* | 2/2005 | Swartz ................. G07G 1/0054 |
| | | 235/383 |
| 2005/0043994 A1* | 2/2005 | Walker ................ G06Q 30/0217 |
| | | 705/14.19 |
| 2005/0076210 A1 | 4/2005 | Thomas |
| 2005/0114796 A1* | 5/2005 | Bast ....................... G06F 3/0338 |
| | | 715/856 |
| 2005/0124321 A1* | 6/2005 | Kraft ..................... G06Q 20/326 |
| | | 455/414.1 |
| 2005/0131837 A1* | 6/2005 | Sanctis ................ G06Q 20/1235 |
| | | 705/64 |
| 2005/0149385 A1* | 7/2005 | Trively ............... G06Q 30/0224 |
| | | 705/14.25 |
| 2005/0150945 A1* | 7/2005 | Choi ..................... G07F 7/0886 |
| | | 235/379 |
| 2005/0165646 A1* | 7/2005 | Tedesco ................ B42D 15/00 |
| | | 705/14.1 |
| 2005/0177517 A1* | 8/2005 | Leung .................... G06Q 20/20 |
| | | 705/64 |
| 2005/0187873 A1* | 8/2005 | Labrou .................. G07F 7/0886 |
| | | 705/40 |
| 2005/0190970 A1 | 9/2005 | Griffin |
| 2005/0195816 A1* | 9/2005 | Sumiyoshi ............... H04L 12/18 |
| | | 370/390 |
| 2005/0207365 A1* | 9/2005 | Balachandran ....... H04W 28/06 |
| | | 370/312 |
| 2005/0210387 A1* | 9/2005 | Alagappan ............... H04L 29/06 |
| | | 715/700 |
| 2005/0215231 A1 | 9/2005 | Bauchot |
| 2005/0216343 A1* | 9/2005 | Tokorotani .............. G07F 17/40 |
| | | 705/14.26 |
| 2005/0222961 A1* | 10/2005 | Staib .................... H04M 1/0254 |
| | | 705/64 |
| 2005/0240484 A1* | 10/2005 | Yan ...................... G06Q 20/322 |
| | | 455/411 |
| 2005/0283444 A1* | 12/2005 | Ekberg ................. G06Q 20/40 |
| | | 705/67 |
| 2006/0014518 A1* | 1/2006 | Huh ....................... H04M 15/06 |
| | | 455/406 |
| 2006/0031160 A1* | 2/2006 | Villa ...................... G06Q 20/10 |
| | | 705/44 |
| 2006/0031752 A1* | 2/2006 | Surloff .................... G06F 3/0213 |
| | | 707/E17.112 |
| 2006/0036488 A1* | 2/2006 | Golan .................... G06Q 30/02 |
| | | 705/14.67 |
| 2006/0044153 A1* | 3/2006 | Dawidowsky ..... G06K 19/0723 |
| | | 710/10 |
| 2006/0050672 A1* | 3/2006 | Shim ....................... H04L 67/18 |
| | | 370/338 |
| 2006/0052086 A1* | 3/2006 | Funato .................... H04W 4/12 |
| | | 455/411 |
| 2006/0059227 A1* | 3/2006 | Zimler ................. G06F 16/9577 |
| | | 707/E17.121 |
| 2006/0064346 A1* | 3/2006 | Steenstra ................ H04L 67/18 |
| | | 705/14.66 |
| 2006/0085260 A1* | 4/2006 | Yamagishi ............. G06Q 30/02 |
| | | 705/14.35 |
| 2006/0085271 A1* | 4/2006 | Tokita .................... G06Q 30/06 |
| | | 705/26.8 |
| 2006/0085310 A1* | 4/2006 | Mylet .................... G06Q 20/40 |
| | | 705/35 |
| 2006/0089874 A1* | 4/2006 | Newman ................ G06Q 10/10 |
| | | 705/14.32 |
| 2006/0091200 A1 | 5/2006 | Lai |
| 2006/0114987 A1 | 6/2006 | Roman |
| 2006/0123359 A1* | 6/2006 | Schatzberger ......... G06F 3/0481 |
| | | 715/810 |
| 2006/0135156 A1* | 6/2006 | Malu ...................... H04W 8/18 |
| | | 455/432.3 |
| 2006/0136292 A1* | 6/2006 | Bhati .................. G06Q 30/0267 |
| | | 705/14.66 |
| 2006/0143091 A1* | 6/2006 | Yuan .................... G06Q 30/0601 |
| | | 705/26.1 |
| 2006/0149630 A1 | 7/2006 | Elliott |
| 2006/0165060 A1* | 7/2006 | Dua ...................... G06Q 20/42 |
| | | 705/76 |
| 2006/0178130 A1 | 8/2006 | Makrygiannis |
| 2006/0180660 A1* | 8/2006 | Gray ......................... G07F 7/10 |
| | | 455/414.1 |
| 2006/0190351 A1* | 8/2006 | Dennis ................... G06Q 20/04 |
| | | 379/201.01 |
| 2006/0191995 A1* | 8/2006 | Stewart .................. G06Q 20/02 |
| | | 235/382 |
| 2006/0206709 A1* | 9/2006 | Labrou .................. G06Q 20/18 |
| | | 713/167 |
| 2006/0212401 A1* | 9/2006 | Ameerally ............. G06Q 30/02 |
| | | 705/51 |

(56) References Cited

U.S. PATENT DOCUMENTS

| | | | |
|---|---|---|---|
| 2006/0218092 A1* | 9/2006 | Tedesco | G06Q 20/14 705/40 |
| 2006/0219780 A1* | 10/2006 | Swartz | G07F 7/1008 235/383 |
| 2006/0240808 A1* | 10/2006 | Crolley | G06Q 30/0265 455/414.1 |
| 2006/0242267 A1 | 10/2006 | Grossman | |
| 2006/0253801 A1* | 11/2006 | Okaro | H04M 1/72403 715/810 |
| 2006/0261149 A1* | 11/2006 | Raghavendra Tulluri | G07F 19/20 235/379 |
| 2006/0287920 A1* | 12/2006 | Perkins | G06Q 30/02 707/999.107 |
| 2006/0294025 A1* | 12/2006 | Mengerink | G06Q 30/0601 705/77 |
| 2007/0004391 A1 | 1/2007 | Maffeis | |
| 2007/0011099 A1* | 1/2007 | Sheehan | G06Q 20/367 705/65 |
| 2007/0021969 A1* | 1/2007 | Homeier-Beals | G06Q 20/32 705/16 |
| 2007/0022058 A1* | 1/2007 | Labrou | G06Q 20/3272 705/67 |
| 2007/0067329 A1 | 3/2007 | Kamva | |
| 2007/0095892 A1 | 5/2007 | Lyons | |
| 2007/0015060 A1 | 6/2007 | Angelica | |
| 2007/0125838 A1* | 6/2007 | Law | G06Q 20/357 705/65 |
| 2007/0125840 A1* | 6/2007 | Law | G06Q 40/02 705/65 |
| 2007/0138299 A1* | 6/2007 | Mitra | G06Q 20/341 235/492 |
| 2007/0131759 A1 | 7/2007 | Cox | |
| 2007/0156436 A1* | 7/2007 | Fisher | G06Q 20/204 705/40 |
| 2007/0175978 A1* | 8/2007 | Stambaugh | G06Q 40/12 235/379 |
| 2007/0179883 A1* | 8/2007 | Questembert | G06Q 20/10 705/39 |
| 2007/0204004 A1* | 8/2007 | Coyer | H04L 65/4076 709/217 |
| 2007/0210155 A1* | 9/2007 | Swartz | G06Q 20/20 235/383 |
| 2007/0235519 A1 | 10/2007 | Jang | |
| 2007/0235539 A1* | 10/2007 | Sevanto | G07F 7/1008 235/451 |
| 2007/0255662 A1 | 11/2007 | Tumminaro | |
| 2007/0270166 A1* | 11/2007 | Hampel | H04L 51/20 455/456.3 |
| 2007/0293155 A1* | 12/2007 | Liao | G06Q 20/326 455/41.2 |
| 2008/0004952 A1* | 1/2008 | Koli | G06Q 30/0267 705/14.55 |
| 2008/0006685 A1* | 1/2008 | Rackley, III | G06Q 40/00 235/379 |
| 2008/0010190 A1* | 1/2008 | Rackley, III | G06Q 20/32 705/39 |
| 2008/0010191 A1* | 1/2008 | Rackley, III | G06Q 20/223 705/39 |
| 2008/0010192 A1* | 1/2008 | Rackley, III | G06Q 20/10 705/39 |
| 2008/0010193 A1* | 1/2008 | Rackley, III | G06Q 20/326 705/39 |
| 2008/0010196 A1* | 1/2008 | Rackley, III | G06Q 40/00 705/40 |
| 2008/0010204 A1* | 1/2008 | Rackley, III | G06Q 20/14 705/45 |
| 2008/0010215 A1* | 1/2008 | Rackley, III | G06Q 20/108 705/70 |
| 2008/0011825 A1* | 1/2008 | Giordano | G06Q 20/04 235/383 |
| 2008/0017704 A1* | 1/2008 | VanDeburg | G06Q 20/3415 235/380 |
| 2008/0027795 A1* | 1/2008 | Medlin | G06Q 20/387 705/14.23 |
| 2008/0294556 A1 | 1/2008 | Anderson | |
| 2008/0040265 A1* | 2/2008 | Rackley, III | G06Q 20/102 705/40 |
| 2008/0045172 A1* | 2/2008 | Narayanaswami | G06Q 30/02 455/187.1 |
| 2008/0046366 A1* | 2/2008 | Bemmel | G06Q 20/20 705/44 |
| 2008/0048022 A1* | 2/2008 | Vawter | G06Q 20/388 235/380 |
| 2008/0051059 A1* | 2/2008 | Fisher | G06Q 20/327 455/410 |
| 2008/0051142 A1* | 2/2008 | Calvet | H04W 88/02 455/558 |
| 2008/0052192 A1* | 2/2008 | Fisher | G06Q 30/0641 705/5 |
| 2008/0052233 A1* | 2/2008 | Fisher | G06Q 20/325 705/40 |
| 2008/0059329 A1* | 3/2008 | Luchene | G06Q 30/0603 705/26.81 |
| 2008/0097915 A1* | 4/2008 | Golan | G06Q 30/02 705/14.69 |
| 2008/0126145 A1* | 5/2008 | Rackley, III | G06Q 20/3223 455/406 |
| 2008/0133336 A1* | 6/2008 | Altman | G06T 11/206 705/14.1 |
| 2008/0139155 A1 | 6/2008 | Boireau | |
| 2008/0140520 A1* | 6/2008 | Hyder | G06Q 30/0207 705/14.1 |
| 2008/0148040 A1* | 6/2008 | Machani | G06F 21/6245 713/193 |
| 2008/0167017 A1* | 7/2008 | Wentker | G06Q 20/10 455/406 |
| 2008/0167961 A1* | 7/2008 | Wentker | G06Q 20/322 705/14.25 |
| 2008/0167988 A1* | 7/2008 | Sun | G06Q 20/085 455/406 |
| 2008/0172274 A1* | 7/2008 | Hurowitz | H04L 67/26 455/433 |
| 2008/0172285 A1* | 7/2008 | Hurowitz | G06Q 30/02 725/23 |
| 2008/0172291 A1* | 7/2008 | Hurowitz | G06Q 30/02 705/14.1 |
| 2008/0172292 A1* | 7/2008 | Hurowitz | G06Q 30/02 725/23 |
| 2008/0177668 A1 | 7/2008 | Delean | |
| 2008/0207234 A1* | 8/2008 | Arthur | G06Q 20/322 455/466 |
| 2008/0208681 A1 | 8/2008 | Hammad | |
| 2008/0208743 A1* | 8/2008 | Arthur | G06Q 40/00 705/41 |
| 2008/0208744 A1* | 8/2008 | Arthur | G06Q 10/00 705/41 |
| 2008/0208762 A1* | 8/2008 | Arthur | G06Q 20/027 705/79 |
| 2008/0221997 A1* | 9/2008 | Wolfe | G06Q 30/02 705/14.39 |
| 2008/0242274 A1* | 10/2008 | Swanburg | H04L 67/306 455/414.1 |
| 2008/0249938 A1* | 10/2008 | Drake-Stoker | G06Q 20/40 726/2 |
| 2008/0255947 A1* | 10/2008 | Friedman | G06Q 20/3221 455/414.2 |
| 2008/0262928 A1* | 10/2008 | Michaelis | G06Q 30/02 705/14.39 |
| 2008/0274794 A1* | 11/2008 | Mathieson | G06Q 30/02 463/25 |
| 2008/0275779 A1* | 11/2008 | Lakshminarayanan | G06Q 20/3823 705/39 |
| 2008/0281694 A1 | 11/2008 | Kretz | |
| 2008/0305774 A1 | 12/2008 | Ramakrishna | |
| 2009/0000618 A1 | 1/2009 | Hameen-Anttila | |

(56) References Cited

U.S. PATENT DOCUMENTS

| | | | | |
|---|---|---|---|---|
| 2009/0018913 | A1* | 1/2009 | Sarukkai | H04M 3/53383 705/14.56 |
| 2009/0061884 | A1* | 3/2009 | Rajan | G06Q 30/0225 455/445 |
| 2009/0063312 | A1* | 3/2009 | Hurst | G06Q 20/206 705/41 |
| 2009/0076906 | A1* | 3/2009 | Kansal | G06Q 30/0261 705/14.64 |
| 2009/0076912 | A1* | 3/2009 | Rajan | G06Q 30/0267 705/14.64 |
| 2009/0098825 | A1 | 4/2009 | Huomo | |
| 2009/0106112 | A1* | 4/2009 | Dalmia | G06Q 40/12 709/204 |
| 2009/0112747 | A1* | 4/2009 | Mullen | G06Q 40/02 705/35 |
| 2009/0124234 | A1* | 5/2009 | Fisher | G06Q 20/108 455/406 |
| 2009/0132362 | A1* | 5/2009 | Fisher | G06Q 30/06 705/16 |
| 2009/0143104 | A1* | 6/2009 | Loh | G06Q 20/3278 340/10.1 |
| 2009/0144161 | A1* | 6/2009 | Fisher | G06Q 30/0268 705/16 |
| 2009/0177587 | A1* | 7/2009 | Siegal | G06Q 20/10 705/67 |
| 2009/0194591 | A1* | 8/2009 | Gobburu | H04H 60/48 235/462.01 |
| 2009/0227281 | A1* | 9/2009 | Hammad | G06K 19/07309 340/10.1 |
| 2010/0057619 | A1* | 3/2010 | Weller | G06Q 20/04 455/414.1 |
| 2010/0063895 | A1* | 3/2010 | Dominguez | G06Q 20/40 705/26.1 |
| 2010/0105375 | A1 | 4/2010 | Schroter | |
| 2010/0145835 | A1* | 6/2010 | Davis | G06Q 40/12 705/30 |
| 2010/0312694 | A1* | 12/2010 | Homeier-Beals | G06Q 20/20 705/39 |
| 2011/0055038 | A1* | 3/2011 | Mengerink | G06Q 20/085 705/26.1 |
| 2011/0320316 | A1* | 12/2011 | Randazza | G06Q 30/0617 705/26.43 |
| 2012/0030044 | A1* | 2/2012 | Hurst | G06Q 20/32 705/16 |
| 2012/0150744 | A1* | 6/2012 | Carlson | G06Q 20/322 705/44 |
| 2012/0215573 | A1* | 8/2012 | Sussman | G06Q 30/0603 705/5 |
| 2012/0220314 | A1* | 8/2012 | Altman | G06Q 30/0269 455/456.3 |
| 2012/0265677 | A1* | 10/2012 | Rackley, III | G06Q 30/06 705/41 |
| 2013/0013501 | A1* | 1/2013 | Rackley, III | G06Q 20/10 705/41 |
| 2013/0054470 | A1* | 2/2013 | Campos | G06Q 20/40 705/67 |
| 2013/0212016 | A1* | 8/2013 | Davis | G06Q 20/3223 705/42 |

OTHER PUBLICATIONS

U.S. Appl. No. 11/933,321, Office Action dated May 27, 2010, 11 p.
U.S. Appl. No. 15/134,101, Office Action dated 11-02017.
"ViVOtech to DemonstrateIndustry's First End-to-End Near Field Communication (NFC) Solution at the NRF Show." Business Wire: 1 Jan. 16, 2006. Business Dateline; Hoover's Company Profiles; ProQuest Central. Web. Oct. 5, 2012.
"Real Time" https://en.wikipedia.org/wiki/Real-time_computing.
U.S. Appl. No. 11/933,351, Office Action dated Oct. 3, 2008, 5 p.
U.S. Appl. No. 11/933,367, Office Action dated May 27, 2010, 8 p.
U.S. Appl. No. 12/592,581, Office Action dated Jun. 4, 2010, 20 p.
U.S. Appl. No. 11/933,351, Office Action dated Jul. 8, 2009, 7 p.
U.S. Appl. No. 11/939,821, Office Action dated Aug. 17, 2010, 11 p.
U.S. Appl. No. 11/933,351, Office Action dated Aug. 18, 2010, 16 p.
Deena, M. Amato, "Mobile Rewards." Chain Store Age 82.5 (2006): 160, 161, 163. Hoover's Company Profiles; ProQuest Central. Web. Oct. 5, 2012.
"GPS" https://en.wikipedia.org/wiki/Assisted_GPS.
"Satellite navigation device" https://en.m.wikipedia.org/wiki/Sateliite_navigation_device.
"Mobile Television" https://en.wikipedia.org/wiki/Mobile_television.
"Multicast" https://en.wikipedia.org/wiki/Multicast.
U.S. Appl. No. 11/933,337, Office Action dated May 27, 2010, 9 p.
1739369(MasterCard PayPass.pdf.
IPR2021-01499 Board Decision dated Mar. 14, 2022, 25 p.
IPR2021-01500 Board Decision dated Mar. 14, 2022, 25 p.
IPR2021-01501 Board Decision dated Mar. 14, 2022, 25 p.
"Text Messaging" https://en.m.wikipedia.org/wiki/Text_messaging.
"Text Based User Interface" https://en.wikipedia.org/wiki/User_interface.
"Web Browser" https://techterms.com/definition/web_browser.
"WAP" https://en.wikipedia.org/wiki/Wireless_Application_Protocol.
"Multimedia messaging" https://en.wikipedia.org/wiki/Multimedia_Messaging_Service#Technical_description.
Web based user interface https://en.wikipedia.org/wiki/User_interface.
Ajax https://techterms.com/definition/ajax.
Java script https://techterms.com/definition/javascript.
"Browser games" www.60freegames.com/Free-to-Play/Browser-Games.
"Online shopping" https://en.wikipedia.org/wiki/Online_shopping.
"Social networking services" https://en.wikipedia.org/wiki/Social_networking_service.
"Web mapping" https://en.wikipedia.org/wiki/Web_mapping.
"Mobile browser" https://en.wikipedia.org/wiki/Mobile_browser.
"Voice browser" https://en.wikipedia.org/wiki/Voice_browser.
"Email" https://techterms.com/definition/email.
"Web mail" https://en.wikipedia.org/wiki/Webmail ).
"WAP Browser" https://en.m.wikipedia.org/wiki/Wireless_Application_Protocol.
"Binary application" https://en.m.wikipedia.org/wiki/Application_binary_interface.
"GPS" https://en.m.wikipedia.org/wiki/Global_Positioning_System.
"GPS API" https://en.m.wikipedia.org/wiki/W3C_Geolocation_API.
"Web API" https://en.wikipedia.org/wiki/Web_API.
"Application Programming Interface" Dictionary of Computer Terms,1994.
"Application Programming Interface" https://en.wikipedia.org/wiki/API.
"Assisted GPS" https://en.m.wikipedia.org/wiki/Assisted_GNSS.
"Satellite navigation device" https://en.m.wikipedia.org/wiki/Satellite_navigation_device.
"Geolocation API" https://en.wikipedia.org/wiki/W3C_Geolocation_API.
"Mobile Phone Tracking" https://en.m.wikipedia.org/wiki/Mobile_phone_tracking.
IPR2021-01499.
IPR2021-01500.
IPR2021-01501.

* cited by examiner

REMOTE DELIVERY OF DIGITAL ARTIFACTS WITHOUT A PAYMENT TRANSACTION

CROSS-REFERENCE TO RELATED APPLICATIONS

This application is a continuation of application Ser. No. 13/735,337, filed Jan. 7, 2013, titled "REMOTE TRANSACTION PROCESSING USING AUTHENTICATION INFORMATION" which is a continuation and claims priority to application Ser. No. 11/948,903, filed Nov. 30, 2007, titled "METHOD AND SYSTEM FOR CONDUCTING AN ONLINE PAYMENT TRANSACTION USING A MOBILE COMMUNICATION DEVICE", both of which is incorporated by reference herein in its entirety.

FIELD OF INVENTION

The present invention relates to data communications and wireless devices.

BACKGROUND OF THE INVENTION

Mobile communication devices—e.g., cellular phones, personal digital assistants, and the like are increasingly being used to conduct payment transactions as described in U.S. patent application Ser. No. 11/933,351, entitled "Method and System For Scheduling A Banking Transaction Through A Mobile Communication Device", and U.S. patent application Ser. No. 11/467,441, entitled "Method and Apparatus For Completing A Transaction Using A Wireless Mobile Communication Channel and Another Communication Channel, both of which are incorporated herein by reference. Such payment transactions can include, for example, purchasing goods and/or services, bill payments, and transferring funds between bank accounts.

BRIEF SUMMARY OF THE INVENTION

In general, this specification describes a method and system for conducting an online payment transaction through a point of sale device. The method includes receiving input from a user selecting an item for purchase through the point of sale device; calculating a total purchase amount for the item in response to a request from the user to purchase the item; and sending payment authorization for the total purchase amount from the point of sale device to a payment entity, in which the payment authorization is sent to the payment entity via a mobile communication device of the user. The method further includes receiving a result of the payment authorization from the payment entity through the mobile communication device; and completing the payment transaction based on the result of the payment authorization.

Particular implementations can include one or more of the following features. The point of sale device can be a desktop computer, a laptop computer, or a terminal. The mobile communication device can be a cellular phone, a wireless personal digital assistant (PDA), or a laptop computer. The cellular phone can be an NFC-enabled phone. Sending payment authorization for the total purchase amount from the point of sale device to a payment entity can include sending the payment authorization securely to the payment entity. The payment entity can be a person, a computer system, or a bank. The method can further include maintaining a shopping list on the mobile communication device of the user, in which the shopping list includes a listing of one or more items to be purchased by the user. The payment authorization can be an authorization for payment with a credit card, a debit card, or a prepaid card.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

Figure 1:
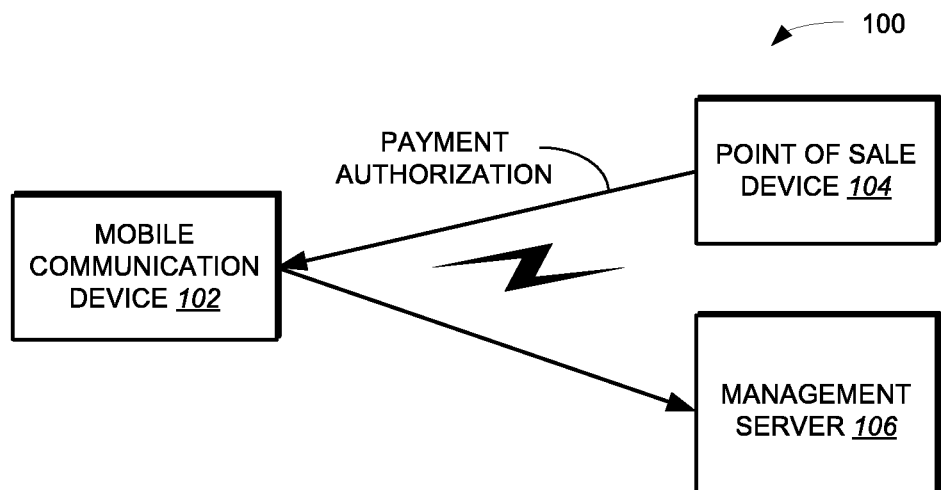
FIG. 1 illustrates a block diagram of a communication system including a wireless mobile communication device and a management server in accordance with one implementation.

FIG. 1 illustrates one implementation of a communication system 100. The communication system 100 includes a hand-held, wireless mobile communication device 102 a point-of-sale device 104 and a management server 106. In one implementation, the mobile communication device 102 includes a mobile application (discussed in greater detail below) that permits a user of the mobile communication device 102 to conduct payment transactions. Payment transactions can include, for example, using contactless payment technology at a retail merchant point of sale (e.g., through point of sale device 104), using mobile/internet commerce (e.g., purchase tickets and products, etc.), storage of payment information and other digital artifacts (e.g., receipts, tickets, coupons, etc.), storage of banking information (payment account numbers, security codes, PIN's, etc.), and accessing banking service (account balance, payment history, bill pay, fund transfer, etc.), and so on. The mobile communication device 102 can be a cellular phone, a wireless personal digital assistant (PDA), a laptop computer, or other wireless communication device. The point of sale device 104 can be a desktop computer, laptop computer, terminal, or other device that is configured to receive user input selecting items for purchase or other transaction.

In one implementation, authorizations for payment transactions that are made through the point of sale device 104 are sent from the point of sale device 104 to an issuer authorization (e.g., management server 106) through the mobile communication device 102 (as shown in FIG. 1). In one implementation, an issuer authorization is a payment entity that either approves or disapproves a payment transaction. An issuer authorization can be, e.g., a person, computer system, bank (or other third party). One potential benefit of having payment authorizations flow through the mobile communication device 102 is that sensitive user information (e.g. account numbers, pin numbers, and/or identity information) need only be sent from the mobile communication device 102 directly to an issuer authorization. Such operation reduces the potential for identity theft and/or fraudulent purchases made through a point of sale device. For example, (in one implementation) payment authorizations cannot be sent to an issuer authorization if the mobile communication device 102 is turned off.

Figure 2:
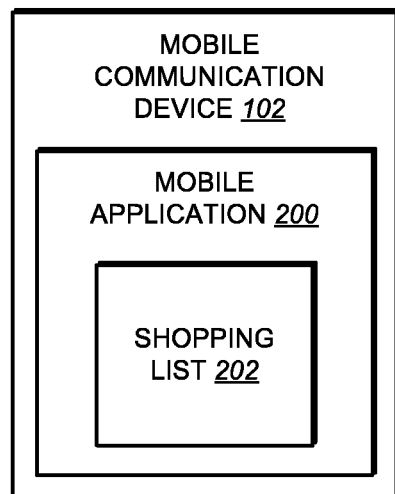
FIG. 2 illustrates one implementation of the wireless mobile communication device of FIG. 1.

FIG. 2 illustrates one implementation of the mobile communication device 102. The mobile communication device 102 includes a mobile application 200 that (in one implementation) is provided to the mobile communication device 102 through a remote server (e.g., management server 106). In one implementation, the mobile application is a Mobile Wallet application available from Mobile Candy Dish, Inc., of Alameda, Calif. In one implementation, the mobile application is a hosted service, as described in U.S. patent application Ser. No. 11/939,821, entitled "Method and System For Securing Transactions Made Through a Mobile Communication Device", which is incorporated herein by reference. In one implementation, the mobile application 200 is configured to send requests to the management server for artifacts based on user input, e.g., received though a keypad (not shown) of the mobile communication device 102. Requests to the management server 106 can also be automated, via proximity-based services, e.g., consumer tapping (or in close proximity) an LBS/contactless/RFID enabled phone against a smart poster (RFID/Bluetooth/LBS enabled, etc.), kiosk, or other device.

In one implementation, the mobile application 200 running on the mobile communication device 102 is configured to receive artifacts (e.g., advertisements, receipts, tickets, coupons, media, content, and so on) from the management server 106. In one implementation, the management server 106 sends artifacts to the mobile application based on user profile information and/or a transaction history (or payment trends) associated with a user of the mobile communication device 102 as described in U.S. patent application Ser. No. 11/944,267, entitled "Method and System For Delivering Information To a Mobile Communication Device Based On Consumer Transactions", which is incorporated herein by reference.

In one implementation, the mobile communication device 102 is an NFC-enabled phone. The mobile communication device 102 can be NFC-enabled, for example, through an embedded chip or a sticker that is affixed to the cellular phone, as described in U.S. application Ser. No. 11/933,321, entitled "Method and System For Adapting a Wireless Mobile Communication Device For Wireless Transactions", which is incorporated herein by reference. In one implementation, the NFC chip (or sticker) on the cellular phone can be used in conjunction with a merchant's point of sale device as described in greater detail below.

Figure 4:
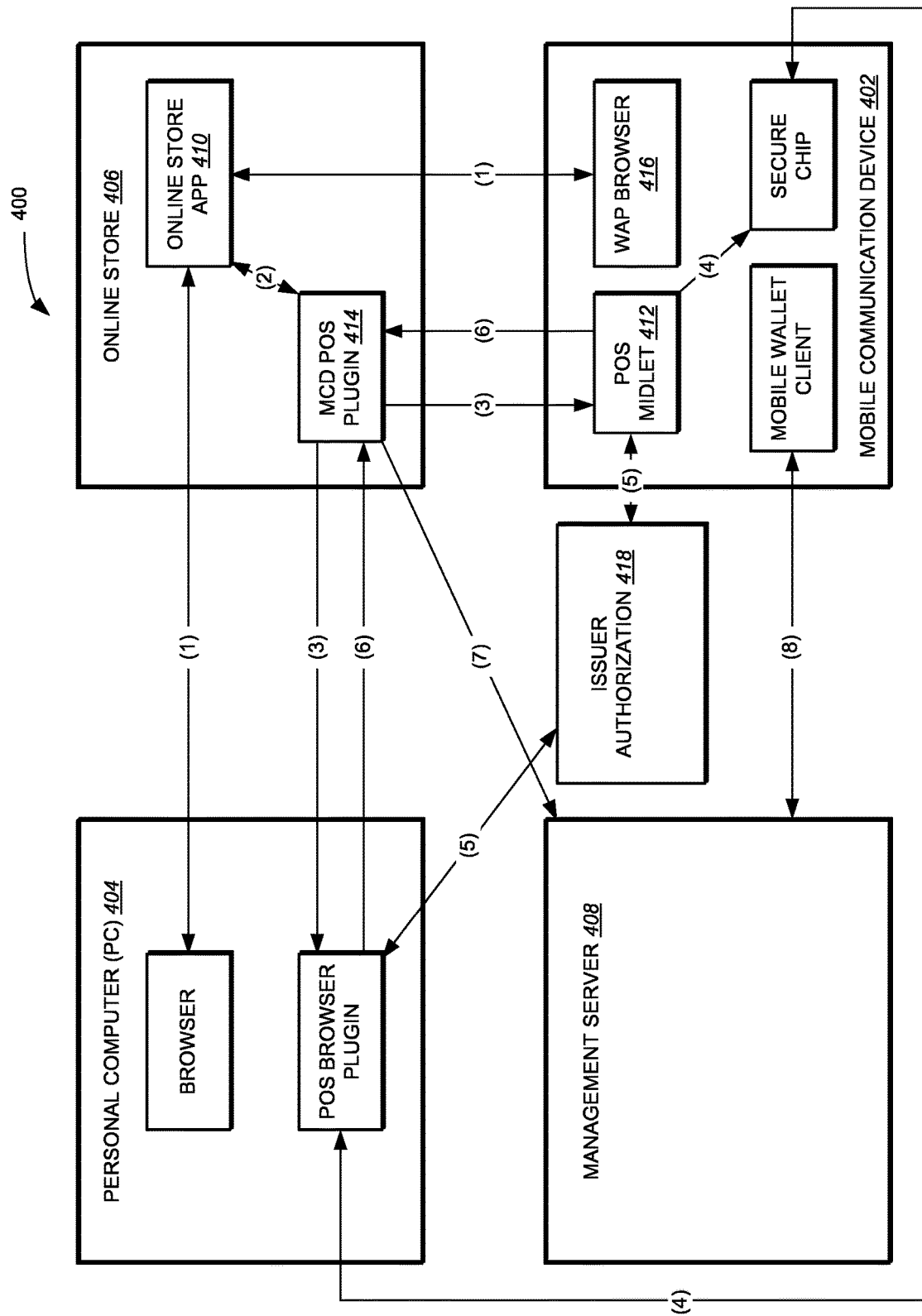
FIG. 4 illustrates a block diagram of a communication system including a wireless mobile communication device and an online store in accordance with one implementation.

For example, with reference to FIG. 4, in one implementation, the NFC chip (or sticker) on the cellular phone can communicate with NFC chips that are installed on the front of PC's (TV's, Kiosks, or any other device) and serve as scanners/readers. In this implementation a mobile candy dish applet (e.g., MCD POS plugin 414) is installed on the consumer's computer (e.g., PC 404) which interfaces with the NFC chip on the PC. When a consumer (or user) is shopping online and they are ready to pay for their products, the consumer opens his mobile wallet and selects one of the payment methods (e.g., credit card, debit card, prepaid card, etc.) from their mobile wallet. If a default card has been selected already, this step is not necessary. The consumer then waves their phone over the NFC reader present on the PC 404. The consumer's payment credentials are transferred from the phone to the merchant website (e.g., online store application 410) using a communication protocol between the chip in the phone and the chip in the PC, which can be radio frequency for example. If the consumer has coupons in their mobile wallet the consumer can either elect to manually apply the coupon, save the coupon for a future use (against a larger purchase for example), or have the coupon automatically applied during the transaction and the transaction amount is updated. After the consumer enters any necessary validation information (e.g., pin) to provide a multi-factor authentication and confirms the transaction, the online purchase is processed as normal by the merchant's online processor. The mobile wallet can retrieve transaction data, account balance from the management server 408.

In one implementation, the mobile communication device 102 is a non NFC-enabled phone. In this implementation, the consumer connects his phone to the PC 404 via some non radio frequency method (e.g., IR, Bluetooth, USB cable, etc.). When a consumer is shopping online and they are ready to pay for their products, the consumer opens his mobile wallet and selects one of the payment methods (e.g., credit card, debit card, prepaid card, etc.) from their mobile wallet. If a default card has been selected already, this step is not necessary. The consumer then pushes, e.g., a "Buy now" button and the consumer's payment credentials are transferred from the phone to the merchant website (e.g., online store application 410) using the protocol between the phone and the PC 404 which can be radio frequency, for example. If the consumer has coupons in their mobile wallet the consumer can either elect to manually apply the coupon, save the coupon for a future use, or have the coupon automatically applied during the transaction and the transaction amount is updated. After the consumer enters any necessary validation information (e.g., pin) to provide multi-factor authentication and confirms the transaction, the online purchase is processed as normal by the merchant's online processor. The mobile wallet can retrieve transaction data and account balance from the management server 408.

In one implementation, the management server 408 and merchant portal (e.g., online store 408) are maintained by trusted parties and use an encrypted tunnel to transfer financial data. When the consumer is ready to pay for their online product, they enter their cell phone number on the merchant portal. The merchant portal (which has an MCD applet (e.g., MCD POS plugin 414) installed on its server) securely connects to the management server 408 (that in one implementation is maintained by Mobile Candy Dish (MCD)). In one implementation, the management server 408 identifies the consumer through their cell phone number, and verifies the consumer's authenticity by sending a unique transaction code to the consumer mobile wallet on their cell phone. The consumer then enters this unique transaction code onto the merchant's web portal. The merchant portal sends this transaction number to the management server 408 for authentication. Upon authentication, the consumer's virtual wallet and payment methods (e.g., credit card, debit card, prepaid card, etc.) are securely retrieved, from the management server 408 and are displayed to the consumer in a window on a website associated with the merchant portal. The consumer selects one of these payment methods to pay for their transaction. If a default card has been selected already, this step is not necessary. If the consumer has coupons in their mobile wallet the consumer can either elect to manually apply the coupon, save the coupon for a future use, or have the coupon automatically applied during the transaction and the transaction amount is updated. After the consumer enters any necessary validation information to provide a multi-factor authentication and confirms the transaction, the online purchase is processed as normal by the merchant's online processor. The mobile wallet can retrieve transaction data, account balance from the management server 408.

Referring to FIG. 2, in one implementation, the mobile application 200 maintains a shopping list 202 for a consumer. Accordingly, consumers have the ability to store their shopping list in their mobile wallet and add, delete, or change items on their shopping list either in offline or online mode. In one implementation, consumers are sent coupons based on items on their shopping list, preferences, previous shopping history, proximity to the physical retail store, or a combination of these parameters, as discussed in application Ser. No. 11/944,267, which is incorporated by reference above. If the consumer has coupons in their mobile wallet the consumer can either elect to manually apply the coupon, save the coupon for a future use, or have the coupon automatically applied during the transaction and the transaction amount is updated. When a consumer wants to order the items on their shopping list via an on online merchant (in contrast to a physical retail store), the consumer can logon to the merchant portal and electronically transmit their shopping list to the merchant portal either by waving their phone over NFC enabled PC's or some other connection such as IR, bluetooth, USB, or the like.

Figure 3:
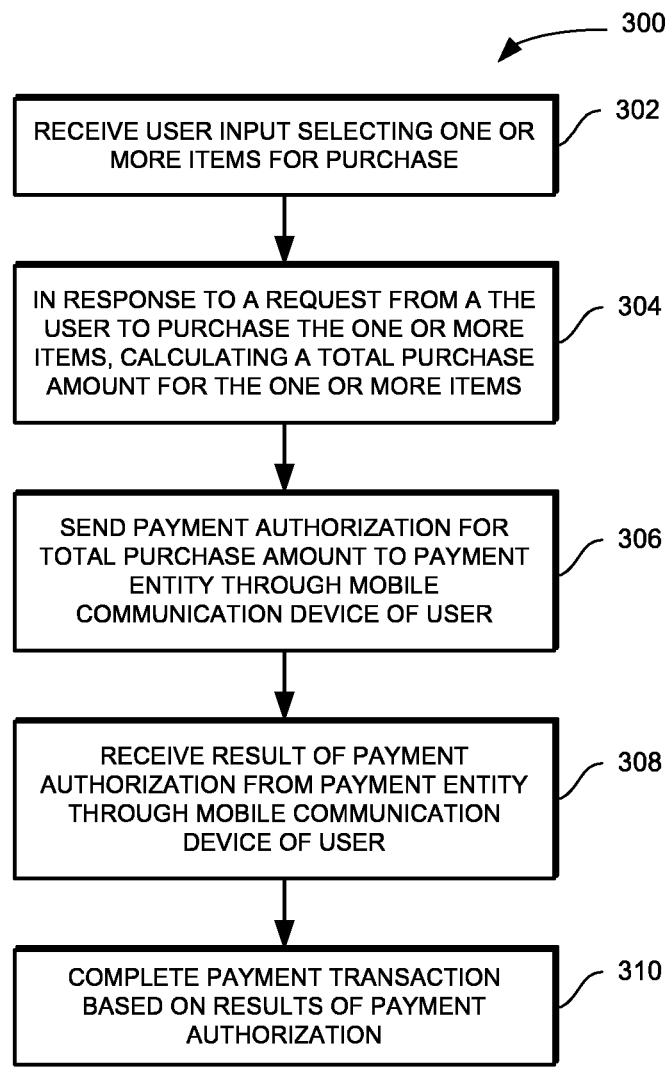
FIG. 3 is a method for conducting a payment transaction using a point of sale device in accordance with one implementation.

FIG. 3 illustrates a method 300 for conducting a payment transaction using a point of sale device (e.g., point of sale device 104). User input is received selecting one or more items for purchase (e.g., at the point of sale device) (step 302). In general, the transaction being made at the point of sale device can be any type of transaction that involves the exchange or transfer of fluids—e.g., the transaction can be a payment transaction, a fund transfer, or other type of transaction. In response to a request from the user to purchase the one or more items, a total purchase amount for the one or more items is calculated (e.g., by the point of sale device) (step 304). If the user has coupons in their mobile wallet the user can either manually apply the coupon or have the coupon automatically applied during the transaction and the transaction amount is updated. The user request to purchase an item can be received, e.g., by a user clicking on a "buy now" icon that is displayed on a graphical user interface of the point of sale device. Payment authorization for the total purchase amount is sent to a payment entity through a mobile communication device of the user (step 306). A result of the payment authorization is received at the point of sale device from the payment entity via the mobile communication device (step 308). The payment transaction is completed based on the result of the payment authorization (step 310). If the payment transaction was authorized by the payment entity, then the sale of the items through the point of sale device is completed. Otherwise, if the payment transaction was not authorized by the payment entity, then the point of sale device terminates the payment transaction.

FIG. 4 illustrates an example payment transaction being made in a communication system 400 in accordance with one implementation. The communication system 400 includes a mobile communication device 402, a personal computer (PC) 404, an online store 406, and a core (or datastore) 408. As indicated by interaction (1), a user (or customer), using a phone (e.g., mobile communication device 402 or personal computer 404), browses an online store website (online store application 410) and finds an item that the customer wishes to purchase. This could also be a purchase made through a midlet application (POS midlet 412) residing on the mobile communication device 402. The user then goes to, e.g., a checkout of the online store 406 make a purchase. If the user has coupons in their mobile wallet the user can either manually apply the coupon or have the coupon automatically applied during the transaction and the transaction amount is updated. When it comes time to authorize the purchase, (in one implementation) the user is given an option to purchase with the mobile communication device 402. In one implementation, the mobile communication device 402 is an NFC-equipped phone (or NFC phone).

In interaction (2), when the user chooses to purchase with the mobile communication device 402, the online store application 410 sends the transaction information for authorization to the POS vendor plugin (e.g., MCD POS plugin 414). In one implementation, the POS vendor plugin is installed in the merchant's online store and enables the merchant to accepts MCD Blaze payments as an alternative form of payment, similar to accepting credit cards for payment. As shown by interaction (3), the POS vendor plugin formats, encrypts, and cryptographically signs the purchase authorization request which is sent via a secure SSL link (e.g., HTTPS, Bluetooth, IR, USB, or other suitable protocol) established by the browser/web application 416 back to the mobile communication device 402. As with the first scenario, all communications is over secure channels. (It may be required that the mobile wallet application be opened prior to beginning a phone online purchase.) The POS midlet 412 is a component of the mobile wallet application that executes PayPass or other payment authorization protocol between itself and the SE payment applications on the mobile communication device 402 (interaction (4)). The results of the request are sent back to the POS vendor plugin.

As shown by interaction (5), the POS midlet 412 then forwards the properly formatted authorization request to a payment entity (e.g., issuer authorization 418) for authorization. The results of the request are then sent back to the POS component of the mobile wallet. Through interaction (6), the POS midlet 412 then forwards the results back to the MCD POS plugin 414 to complete the purchase. The MCD POS plugin 414 then forwards the purchase transaction information to the management server 408 for later customer viewing (interaction (7)). As indicated by interaction (8), users (or customers) will then be able to query the management server 408 and immediately obtain purchase information, either by phone or PC.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 5:
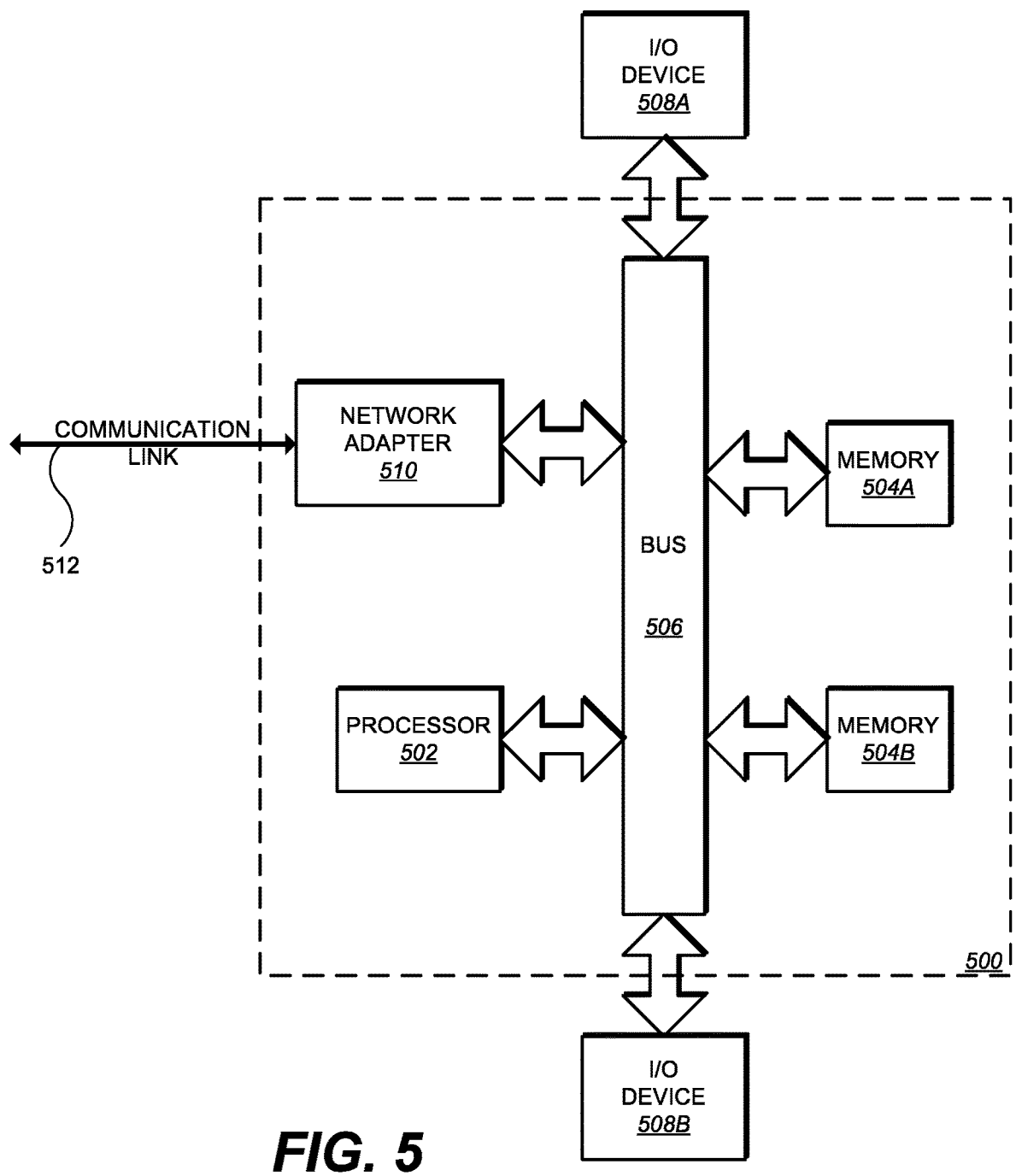
FIG. 5 is a block diagram of a data processing system suitable for storing and/or executing program code in accordance with one implementation.

FIG. 5 illustrates a data processing system 500 suitable for storing and/or executing program code. Data processing system 500 includes a processor 502 coupled to memory elements 504A-B through a system bus 506. In other implementations, data processing system 500 may include more than one processor and each processor may be coupled directly or indirectly to one or more memory elements through a system bus. Memory elements 504A-B can include local memory employed during actual execution of the program code, bulk storage, and cache memories that provide temporary storage of at least some program code in order to reduce the number of times the code must be retrieved from bulk storage during execution. As shown, input/output or I/O devices 508A-B (including, but not limited to, keyboards, displays, pointing devices, etc.) are coupled to data processing system 500. I/O devices 508A-B may be coupled to data processing system 500 directly or indirectly through intervening I/O controllers (not shown).

In one implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

Although the present invention has been particularly described with reference to implementations discussed above, various changes, modifications and substitutes are can be made. Accordingly, it will be appreciated that in numerous instances some features of the invention can be employed without a corresponding use of other features. Further, variations can be made in the number and arrangement of components illustrated in the figures discussed above.

What is claimed is:

1. A method, comprising:
   maintaining a non-browser based application in a mobile device, wherein the non-browser based application is a mobile operating system platform based application with a graphical user interface that is preinstalled or downloaded and installed on the mobile device, wherein the graphical user interface includes a graphical icon, the mobile device comprising a mobile device display, a mobile device memory, a mobile device processor, a mobile device wireless radio transceiver that supports voice and data interactions through a first wireless communication channel, and a mobile device wireless fidelity (Wi-Fi) transceiver;
   receiving, at the non-browser based application, a digital artifact from a remote management server after the digital artifact is selected by the remote management server without a payment transaction in response to user input at the non-browser based application, wherein the non-browser based application receives the user input via the mobile device display; and
   displaying the digital artifact within the non-browser based application.

2. The method of claim 1, further wherein the non-browser based application triggers a call to action using metadata associated with the digital artifact.

3. The method of claim 1, further wherein the remote management server selects the digital artifact based on one or more targeting parameters, wherein the one or more targeting parameters are maintained at the remote management server.

4. A mobile device, comprising:
   a mobile device memory that maintains a non-browser based application, wherein the non-browser based application is a mobile operating system platform based application with a graphical user interface that is preinstalled or downloaded and installed on the mobile device, wherein the graphical user interface includes a graphical icon;
   a mobile device wireless radio transceiver that supports voice and data interactions through a first wireless communication channel;
   a mobile device wireless fidelity (Wi-Fi) transceiver
   a mobile device input interface configured to receive at the non-browser based application, a digital artifact from a remote management server after the digital artifact is selected by the remote management server without a payment transaction in response to user input at the non-browser based application, wherein the non-browser based application receives the user input via a mobile device display; and
   a mobile device output interface configured to display the digital artifact within the non-browser based application.

5. The mobile device of claim 4, further wherein the non-browser based application triggers a call to action using metadata associated with the digital artifact.

6. A non-transitory computer readable medium, comprising:
   computer code for maintaining a non-browser based application in a mobile device, wherein the non-browser based application is a mobile operating system platform based application with a graphical user interface that is preinstalled or downloaded and installed on the mobile device, wherein the graphical user interface includes a graphical icon, the mobile device comprising a mobile device display, a mobile device memory, a mobile device processor, and a mobile device wireless radio-transceiver that supports voice and data interactions through a first wireless communication channel, and a mobile device wireless fidelity (Wi-Fi) transceiver;
   computer code for receiving, at the non-browser based application, a digital artifact from a remote management server after the digital artifact is selected by the remote management server without a payment in response to user input at the non-browser based application, wherein the non-browser based application receives the user input via the mobile device display, and
   computer code for displaying the digital artifact within the non-browser based application.

7. The method of claim 2, wherein the call to action comprises redeeming a coupon, entering an email address, accepting a coupon, accepting a reward, receiving alerts, or receiving notification information.

8. The mobile device of claim 5, wherein the call to action comprises redeeming a coupon, entering an email address, accepting a coupon, accepting a reward, receiving alerts, or receiving notification information.

9. The method of claim 1, further wherein a different digital artifact is associated with a different non-browser based application generated screen.

10. The mobile device of claim 4, further wherein, a different digital artifact is associated with a different non-browser based application generated screen.

11. The method of claim 1, wherein data stored on the mobile device is encrypted using software tools native to the mobile device.

12. The mobile device of claim 4, wherein data stored on the mobile device is encrypted using software tools native to the mobile device.

13. The method of claim 1, wherein the digital artifact is an advertisement, receipt, ticket, coupon, media, or content.

14. The mobile device of claim 4, wherein the digital artifact is an advertisement, receipt, ticket, coupon, media, or content.

15. The mobile device of claim 4, further wherein the remote management server selects the digital artifact based on one or more targeting parameters, wherein the one or more targeting parameters are maintained at the remote management server.

16. The method of claim 1, further wherein upon the condition that the mobile device loses connection with a wireless network, the non-browser based application monitors for access to the wireless network and automatically re-connects to the network when the wireless network is available.

17. The mobile device of claim 4, further wherein upon the condition that the mobile device loses connection with a wireless network, the non-browser based application monitors for access to the wireless network and automatically re-connects to the wireless network when the wireless network is available.

18. The method of claim 1, further wherein the non-browser based application sends a request to the remote management server to retransmit the digital artifact if it has not received the digital artifact from the remote management server within a certain period of time.

19. The method of claim 1, wherein the remote management server sends the digital artifact to the non-browser based application based on the geographical location of the mobile device.

20. The method of claim 1, wherein the non-browser based application receives the digital artifact through a connection of the mobile device to a wireless network;
the non-browser based application displays the digital artifact while the mobile device maintains the connection to the wireless network; and
the method further comprises:
losing the connection of the mobile device to the wireless network while the non-browser based application displays the digital artifact; and
after losing the connection, continuing to display the digital artifact within the non-browser based application.

21. The method of claim 1, wherein the remote management server stores a single user ID for a plurality of the user's mobile devices.

22. The mobile device of claim 4, further wherein the non-browser based application sends a request to the remote management server to retransmit the digital artifact if it has not received the digital artifact from the remote management server within a certain period of time.

23. The mobile device of claim 4, wherein the remote management server sends the digital artifact to the non-browser based application based on the geographical location of the mobile device.

24. The mobile device of claim 4, wherein the non-browser based application receives the digital artifact through a connection of the mobile device to a wireless network;
the non-browser based application displays the digital artifact while the mobile device maintains the connection to the wireless network; and
the method further comprises:
losing the connection of the mobile device to the wireless network while the non-browser based application displays the digital artifact; and
after losing the connection, continuing to display the digital artifact within the non-browser based application.

25. The mobile device of claim 4, wherein the remote management server is configured to store a single userID for a plurality of the user's mobile devices.

26. The method of claim 3, further wherein the one or more targeting parameters comprise personal information or purchase transaction related information.

27. The method of claim 26, further, wherein the purchase transaction related information comprises one or more of information related to historical payment transaction, information related to real-time payment transaction, information related to contactless transactions made using the mobile device, information related to internet commerce, information related to bill pay, information related to top spend categories, information related to merchants, information related to storage of banking information, information related to accessing account balance, information related to accessing payment history, information related to accessing funds transfer, information related to storing tickets, information related to storing receipts, information related to coupons, information related to transactions made by the user but not through the mobile device, or information related to raw data downloaded from banks.

28. The method of claim 3, further wherein the one or more targeting parameters are automatically updated in response to a user transaction on the mobile device.

29. The method of claim 20, further comprising, after losing the wireless connection, triggering a call to action within the non-browser based application using metadata associated with the digital artifact.

30. The method of claim 29, wherein the call to action comprises redeeming a coupon, entering an email address, accepting a coupon, accepting a reward, receiving alerts, or receiving notification information.

31. The method of claim 1, wherein prior to using the non-browser based application the user is authenticated by the remote management server based on user input login information, wherein the non-browser based application receives the user input login information through user input via the mobile device display of the mobile device.

32. The method of claim 31, wherein the user input login information includes information related to biometric data.

33. The method of claim 1, further wherein no sensitive data is stored on the mobile device.

34. The method of claim 33, wherein the sensitive data comprises at least one of information related to the payment method or information related to an expiration date associated with the payment method.

35. The method of claim 21, further wherein a configuration means the remote management server scales.

36. The method of claim 1, further wherein maintaining a payment method at the remote management server results in a more secure system.

37. The method of claim 1, further wherein the digital artifact is relevant to the user.

38. The method of claim 1, further wherein the digital artifact is stored in the mobile device memory to improve the mobile device performance.

39. The method of claim 1, further wherein at least some of the non-browser based application is stored in the mobile device memory during execution of the non-browser based application to provide temporary storage of at least some non-browser based application.

40. The mobile device of claim 15, further wherein the one or more targeting parameters comprise personal information and purchase transaction related information.

41. The mobile device of claim 40, further, wherein the purchase transaction related information comprises one or more of information related to historical payment transaction, information related to real-time payment transaction, information related to contactless transactions made using the mobile device, information related to internet commerce, information related to bill pay, information related to top spend categories, information related to merchants, information related to storage of banking information, information related to accessing account balance, information related to accessing payment history, information related to accessing funds transfer, information related to storing tickets, information related to storing receipts, information related to coupons, information related to transactions made by the user but not through the mobile device, or information related to raw data downloaded from banks.

42. The mobile device of claim 15, further wherein the one or more targeting parameters are automatically updated in response to a user transaction on the mobile device.

43. The mobile device of claim 24, further comprising, after losing the wireless connection, triggering a call to action within the non-browser based application using metadata associated with the digital artifact.

44. The mobile device of claim 43, wherein the call to action comprises redeeming a coupon, entering an email address, accepting a coupon, accepting a reward, receiving alerts, or receiving notification information.

45. The mobile device of claim 4, wherein prior to using the non-browser based application the user is authenticated by the remote management server based on user input login information, wherein the non-browser based application receives the user input login information through user input via the mobile device display of the mobile device.

46. The mobile device of claim 45, wherein the user input login information includes information related to biometric data.

47. The mobile device of claim 4, further wherein no sensitive data is stored on the mobile device.

48. The mobile device of claim 47, wherein the sensitive data comprises at least one of information related to the payment method or information related to an expiration date associated with the payment method.

49. The mobile device of claim 25, further wherein a configuration means the remote management server scales.

50. The mobile device of claim 4, further wherein maintaining a payment method at the remote management server results in a more secure system.

51. The mobile device of claim 4, further wherein the digital artifact is relevant to the user.

52. The mobile device of claim 4, further wherein the digital artifact is stored in the mobile device memory to improve the mobile device performance.

53. The mobile device of claim 4, further wherein at least some of the non-browser based application is stored in the mobile device memory during execution of the non-browser based application to provide temporary storage of at least some non-browser based application.

54. The method of claim 26, wherein personal information comprises one or more of user location, gender, age, interests, affiliation userID, pageid, zip code, area code, or occupation.

55. The mobile device of claim 40, wherein personal information comprises one or more of user location, gender, age, interests, affiliation, userID, pageid, zip code, area code, or occupation.

* * * * *